(12) United States Patent
Arazaki

(10) Patent No.: US 7,239,744 B2
(45) Date of Patent: Jul. 3, 2007

(54) COLOR CONVERSION METHOD, COLOR CONVERSION APPARATUS, COLOR CONVERSION MATRIX GENERATION METHOD AND COLOR CONVERSION MATRIX GENERATION PROGRAM

(75) Inventor: Shinichi Arazaki, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 912 days.

(21) Appl. No.: 10/271,328

(22) Filed: Oct. 15, 2002

(65) Prior Publication Data

US 2003/0081832 A1 May 1, 2003

(30) Foreign Application Priority Data

Oct. 18, 2001 (JP) ............................. 2001-320776
Jul. 30, 2002 (JP) ............................. 2002-221997

(51) Int. Cl.
*G06K 9/00* (2006.01)

(52) U.S. Cl. ................... 382/167; 382/162; 382/274; 358/518; 358/520

(58) Field of Classification Search ................ 382/162, 382/167, 274; 358/1.9, 518, 519, 520, 521, 358/522, 523; 348/223.1, 224.1
See application file for complete search history.

(56) References Cited

U.S. PATENT DOCUMENTS

| | | | |
|---|---|---|---|
| 4,945,406 A | 7/1990 | Cok | |
| 5,001,663 A | 3/1991 | Parulski et al. | |
| 5,170,249 A | 12/1992 | Ohtsubo et al. | |
| 5,668,596 A * | 9/1997 | Vogel | 348/222.1 |
| 5,689,590 A * | 11/1997 | Shirasawa et al. | 382/254 |
| 6,822,657 B2 * | 11/2004 | Baer | 345/589 |
| 2001/0040588 A1 * | 11/2001 | Shiraiwa et al. | 345/690 |
| 2002/0027603 A1 * | 3/2002 | Kuwata et al. | 348/232 |

FOREIGN PATENT DOCUMENTS

| | | |
|---|---|---|
| JP | 08-009410 | 1/1996 |
| JP | 11-113006 | 4/1999 |
| JP | 2000-189945 | 7/2000 |
| JP | 2001-116620 | 4/2001 |

OTHER PUBLICATIONS

Communication from Japanese Patent Office regarding counterpart application.

* cited by examiner

*Primary Examiner*—Matthew C. Bella
*Assistant Examiner*—Ali Bayat
(74) *Attorney, Agent, or Firm*—Harness, Dickey & Pierce, P.L.C.

(57) ABSTRACT

A color conversion method is provided wherein, in a case where color signals outputted by a sensor such as a CCD are to be converted into signals expressive of predetermined colors prescribed in a predetermined color space, a conversion matrix is calculated by a multiple linear regression analysis in consideration of elements based on noise developed by the CCD or the like or on the change of an illuminating light source, and the output signals of the CCD or the like are converted using an obtained conversion matrix.

12 Claims, 2 Drawing Sheets

Fig. 1

| COEFFICIENT GENERATION METHOD | CASE OF CONSIDERING NOISE | CASE OF NOT CONSIDERING NOISE |
|---|---|---|
| AVERAGE ERROR | 1.60 | 1.47 |
| MAXIMUM ERROR | 4.68 | 4.72 |

Fig. 2

| COEFFICIENT GENERATION METHOD | CASE OF CONSIDERING NOISE | CASE OF NOT CONSIDERING NOISE |
|---|---|---|
| AVERAGE ERROR | 3.20 | 5.63 |
| MAXIMUM ERROR | 9.95 | 79.65 |

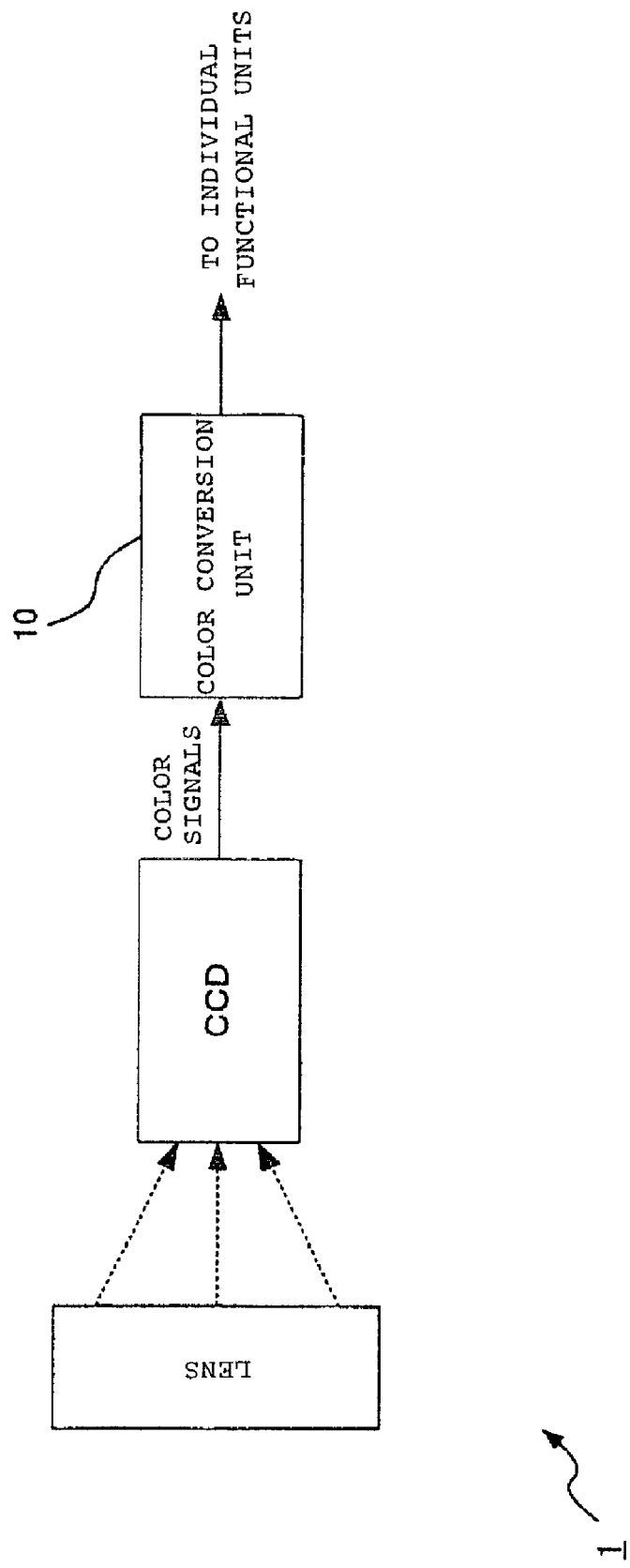

COLOR CONVERSION METHOD, COLOR CONVERSION APPARATUS, COLOR CONVERSION MATRIX GENERATION METHOD AND COLOR CONVERSION MATRIX GENERATION PROGRAM

BACKGROUND OF THE INVENTION

1. Technical Field to Which the Invention Belongs

The present invention relates to a color conversion method and a color conversion apparatus in which a color signal outputted by hardware is converted into a color signal corresponding to a predetermined color space.

2. Prior Art

In hardware which outputs a color image signal utilizing a CCD (Charge Coupled Device), a CMOS (Complementary Metal Oxide Semiconductor) device, or the like, a method employing a lookup table (hereinbelow, abbreviated to "LUT") for color conversion and a method employing a color conversion matrix for color conversion have heretofore been known in correcting an outputted color into an appropriate color.

Here, the method employing the LUT for the color conversion is capable of accurate color corrections, but it requires a large capacity memory for color conversion processing, so that it is difficult to be used in an apparatus, such as image input sensor, which cannot have a large capacity memory. Besides, when it is intended to curtail the LUT, arithmetic processing becomes complicated.

On the other hand, the method employing the color conversion matrix for the color conversion can convert the color at high speed without requiring a large capacity memory, and hence, it is usable even in an apparatus such as an image input sensor.

As the color conversion method employing the color conversion matrix, a technique wherein the color conversion matrix is mechanically calculated by a predetermined method and wherein an inputted color signal is converted into a color signal suited to a predetermined color space, by employing the generated color conversion matrix, is disclosed in, for example, Japanese Patent Application Laid-Open No. 3-16383 and No. 3-252268.

In the prior-art color conversion method employing the color conversion matrix, however, noise developed by the CCD or the like, and the influence of an illuminating light source are not taken into consideration. Therefore, a situation where appropriate color conversion cannot be effected occurs in a case where noise has been developed or where the illuminating light source has changed.

An object of the present invention is to easily convert a color by the use of a color conversion matrix which is capable of more appropriate color conversion.

SUMMARY OF THE INVENTION

In order to solve the above problem, a color conversion method is provided wherein an input color signal (for example, "output signal" in the Detailed Description) is converted into an output color signal (for example, "prescribed signal" in the Detailed Description) prescribed in a predetermined color space (for example, "sRGB space"), characterized by calculating by a multivariate analysis a fundamental conversion matrix (for example, "noiseless-signal conversion matrix") for converting the input color signal into a theoretical value of the output color signal, and a corrective conversion matrix (for example, "noisy-signal conversion matrix") for converting a corrective color signal with a predetermined corrective element added to the input color signal, into the theoretical value of the output color signal; calculating a target conversion matrix (for example, "target conversion matrix") from the fundamental conversion matrix and the corrective conversion matrix; and converting the input color signal into the output color signal in accordance with the target conversion matrix.

The color conversion method may be characterized in that the corrective element is noise predicted to develop in the input color signal.

The color conversion method may be characterized in that a plurality of signal components (for example, respective signals R, G and B in RGB signals) indicating predetermined colors are contained in the input color signal, and that the corrective conversion matrix is calculated for converting the corrective color signal with the noise of the corresponding signal component added to at least one of the signal components as the corrective element, into the theoretical value of the output color signal.

The color conversion method may be characterized in that such corrective color signals are acquired by adding such noise for all combinations of the plurality of signal components, and that such corrective conversion matrix is calculated for converting the corrective color signals of the individual combinations into such theoretical values of the output color signal.

The color conversion method may be characterized in that the corrective element is a color signal change which is based on a difference of an illuminating light source used in generation of the input color signal.

The color conversion method may be characterized in that such corrective color signals are acquired by adding such color signal changes corresponding respectively to a plurality of such illuminating light sources, as such corrective elements, and that such corrective conversion matrix is calculated for converting the corrective color signals for the individual illuminating light sources into such theoretical values of the output color signal.

The color conversion method may be characterized in that the corrective conversion matrix is calculated by the multivariate analysis on the basis of weighting factors which are set in correspondence with the respective illuminating light sources.

The color conversion method may be characterized in that the color signal change is predicted on the basis of an effect of chromatic adaptation and an effect of white balance as are attributed to the difference of the illuminating light source.

The color conversion method may be characterized in that the multivariate analysis is a multiple linear regression analysis.

A color conversion apparatus is also provided wherein an input color signal is converted into an output color signal prescribed in a predetermined color space, characterized by calculating by a multivariate analysis a fundamental conversion matrix for converting the input color signal into a theoretical value of the output color signal, and a corrective conversion matrix for converting a corrective color signal with a predetermined corrective element added to the input color signal, into the theoretical value of the output color signal; obtaining a target conversion matrix by employing the fundamental conversion matrix and the corrective conversion matrix; and converting the input color signal into the output color signal in accordance with the target conversion matrix.

The color conversion apparatus may be characterized in that the corrective element is noise predicted to develop in the input color signal.

The color conversion apparatus may be characterized in that a plurality of signal components indicating predetermined colors are contained in the input color signal; and that the target conversion matrix is obtained on the basis of the corrective conversion matrix for converting the corrective color signal with the noise of each corresponding signal component added to at least one of the signal components as the corrective element, into the theoretical value of the output color signal.

The color conversion apparatus may be characterized in that the corrective color signals are acquired by adding the noise for all combinations of the plurality of signal components, and that the target conversion matrix is obtained on the basis of the corrective conversion matrix for converting the corrective color signals of the individual combinations into the theoretical values of the output color signal.

The color conversion apparatus may be characterized in that the corrective element is a color signal change which is based on a difference of an illuminating light source used in generation of the input color signal.

The color conversion apparatus may be characterized in that the corrective color signals are acquired by adding the color signal changes corresponding to a plurality of illuminating light sources, as the corrective elements, and that the target conversion matrix is obtained on the basis of the corrective conversion matrix for converting the corrective color signals of the individual illuminating light sources into the theoretical values of the output color signal.

The color conversion apparatus may be characterized in that the target conversion matrix is obtained by subjecting the corrective conversion matrix to the multivariate analysis on the basis of weighting factors which are set in correspondence with the respective illuminating light sources.

The color conversion apparatus may be characterized in that the target conversion matrix is obtained by predicting the color signal change on the basis of an effect of chromatic adaptation and an effect of white balance as are attributed to the difference of the illuminating light source.

The color conversion apparatus may be characterized in that the multivariate analysis is a multiple linear regression analysis.

A color conversion matrix generation method is also provided wherein an input color signal is converted into an output color signal prescribed in a predetermined color space, characterized by calculating by a multivariate analysis a fundamental conversion matrix for converting the input color signal into a theoretical value of the output color signal, and a corrective conversion matrix for converting a corrective color signal with a predetermined corrective element added to the input color signal, into the theoretical value of the output color signal; and generating a color conversion matrix from the fundamental conversion matrix and the corrective conversion matrix.

The color conversion matrix generation method may be characterized in that the corrective element is noise predicted to develop in the input color signal.

The color conversion matrix generation method may be characterized in that a plurality of signal components indicating predetermined colors are contained in the input color signal, and that the corrective conversion matrix is calculated for converting the corrective color signal with the noise of each corresponding signal component added to at least one of the signal components as the corrective element, into the theoretical value of the output color signal.

The color conversion matrix generation method may be characterized in that such corrective color signals are acquired by adding such noise for all combinations of the plurality of signal components, and that such corrective conversion matrix is calculated for converting the corrective color signals of the individual combinations into such theoretical values of the output color signal.

The color conversion matrix generation method may be characterized in that the corrective element is a color signal change which is based on a difference of an illuminating light source used in generation of the input color signal.

The color conversion matrix generation method may be characterized in that such corrective color signals are acquired by adding such color signal changes corresponding respectively to a plurality of such illuminating light sources, as such corrective elements, and that such corrective conversion matrix is calculated for converting the corrective color signals for the individual illuminating light sources into such theoretical values of the output color signal.

The color conversion matrix generation method may be characterized in that the corrective conversion matrix is calculated by the multivariate analysis on the basis of weighting factors which are set in correspondence with the respective illuminating light sources.

The color conversion matrix generation method may be characterized in that the color signal change is predicted on the basis of an effect of chromatic adaptation and an effect of white balance as are attributed to the difference of the illuminating light source.

The color conversion matrix generation method may be characterized in that the multivariate analysis is a multiple linear regression analysis.

A color conversion matrix generation program is also provided wherein an input color signal is converted into an output color signal prescribed in a predetermined color space, characterized by causing a computer to incarnate a function of calculating by a multivariate analysis a fundamental conversion matrix for converting the input color signal into a theoretical value of the output color signal, and a corrective conversion matrix for converting a corrective color signal with a predetermined corrective element added to the input color signal, into the theoretical value of the output color signal, and generating a color conversion matrix from the fundamental conversion matrix and the corrective conversion matrix.

The color conversion matrix generation program may be characterized in that the corrective element is noise predicted to develop in the input color signal.

The color conversion matrix generation program may be characterized by causing the computer to incarnate a function of calculating the corrective conversion matrix by which the corrective color signal with the noise of each corresponding signal component added to at least one of a plurality of signal components indicating predetermined colors and contained in the input color signal, as the corrective element, is converted into the theoretical value of the output color signal.

The color conversion matrix generation program may be characterized by causing the computer to incarnate a function of acquiring such corrective color signals by adding such noise for all combinations of the plurality of signal components, and then calculating such corrective conversion matrix for converting the corrective color signals for the individual combinations into such theoretical values of the output color signal.

The color conversion matrix generation program may be characterized in that the corrective element is a color signal change which is based on a difference of an illuminating light source used in generation of the input color signal.

The color conversion matrix generation program may be characterized by causing the computer to incarnate a function of acquiring such corrective color signals by adding such color signal changes corresponding respectively to a plurality of such illuminating light sources, as such corrective elements, and then calculating such corrective conversion matrix for converting the corrective color signals for the individual illuminating light sources into such theoretical values of the output color signal.

The color conversion matrix generation program may be characterized by causing the computer to incarnate a function of calculating the corrective conversion matrix by the multivariate analysis on the basis of weighting factors which are set in correspondence with the respective illuminating light sources.

The color conversion matrix generation program may be characterized by causing the computer to incarnate a function of predicting the color signal change on the basis of an effect of chromatic adaptation and an effect of white balance as are attributed to the difference of the illuminating light source.

The color conversion matrix generation program may be characterized in that the multivariate analysis is a multiple linear regression analysis.

According to the present invention, in a case where input color signals outputted by a sensor such as CCD are to be converted into output color signals expressive of predetermined colors prescribed in a predetermined color space, a fundamental conversion matrix and corrective conversion matrix are calculated by a multivariate analysis in consideration of elements based on noise developed by the CCD or the like or on the change of an illuminating light source, and the input color signals are converted using a target conversion matrix which is obtained from these conversion matrices.

Accordingly, even in a situation where the various elements ascribable to the noise or the change of the illuminating light source are contained in the output signals of the CCD or the like, the target conversion matrix for use in the color conversion can convert the output signals into the signals which are substantially suited to the prescribed color signals, and the color conversion in an apparatus such as a digital camera can be made less susceptible to the noise or the illuminating light source. That is, the color conversion can be easily effected in accordance with the color conversion matrix which is capable of more appropriate color conversion.

Moreover, color conversion can be performed in which the effect of chromatic adaptation and the effect of white balance are taken into consideration, so that the color conversion can be performed more appropriately and more easily.

BRIEF DESCRIPTION OF THE DRAWINGS

FIG. 1 is a diagram showing the errors of RGB signals relative to theoretical values, the RGB signals being calculated while not considering noise (a noiseless-signal conversion matrix) and while considering noise (a target conversion matrix), in a situation where the noise has not developed in the output CYMG signals.

FIG. 2 is a diagram showing the errors of RGB signals relative to the theoretical values, the RGB signals being calculated while not considering noise and while considering noise, in a situation where the noise has developed in the output CYMG signals.

FIG. 3 is a diagram showing the functional construction of a digital camera to which the present invention is applied.

DETAILED DESCRIPTION OF THE PREFERRED EMBODIMENTS

With a color conversion method to which the present invention is applied, a color conversion matrix for converting the color signals (hereinbelow, termed "output signals" as appropriate) of, e.g., RGB (Red Green Blue) or CYMG (Cyan Yellow Magenta Green) outputted by a sensor such as CCD, into color signals (hereinbelow, termed "prescribed signals" as appropriate) representative of corresponding colors prescribed in a predetermined color space (RGB, sRGB: standard RGB, CMYK, or the like), is calculated, and the output of the sensor such as a CCD is converted by the color conversion matrix.

Accordingly, a method for calculating the color conversion matrix will be described in detail below.

Incidentally, an example taken here shall refer to a case where the sensor outputs of the CCD are the CYMG signals (hereinbelow, termed "output CYMG signals") and where these signals are converted into the RGB signals (hereinbelow, termed "prescribed RGB signals") prescribed in the sRGB space.

An expression for converting the output CYMG signals into the prescribed RGB signals in the sRGB space is given by:

Expression 1

$$\begin{pmatrix} R \\ G \\ B \end{pmatrix} = \begin{pmatrix} A11 & A12 & A13 & A14 \\ A21 & A22 & A23 & A24 \\ A31 & A32 & A33 & A34 \end{pmatrix} \begin{pmatrix} Cy \\ Ye \\ Mg \\ Gr \end{pmatrix} \quad (1)$$

Therefore, the appropriate values of conversion coefficients A11–A34 in Expression (1) shall be found.

A Macbeth chart is employed for evaluating the conversion coefficients A11–A34. It is also possible, however, to employ a chart different from the Macbeth chart.

The "Macbeth chart" is a chart in which the individual colors of flesh color, green, sky blue, etc. are indicated with characteristics close to actual spectral distribution characteristics.

Herein, the conversion coefficients A11–A34 are calculated so as to minimize the errors between RGB signals obtained in such a way that the output CYMG signals, which are the results of the photographing of the Macbeth chart by hardware being a subject for color conversion, such as a digital still camera, are converted in accordance with Expression (1), and theoretical values in the case where the calorimetric values of the individual colors of the Macbeth chart are converted into RGB signals.

On this occasion, the conversion coefficients A11–A34 shall be calculated considering, not only the spectral distribution characteristics of the CCD of the hardware for use in the photographing, but also those of all other factors such as an Ir (infrared) cut filter, a lens and an illuminating light source. Besides, a multiple linear regression analysis which is one technique of a multivariate analysis is employed for the calculation of the conversion coefficients A11–A34, and the conversion coefficients A11–A34 which minimize the squared errors of the RGB signals relative to the theoretical values are evaluated.

The following expression is an equation for evaluating the conversion coefficients A11–A14 (conversion coefficients for the R signal) with the multiple linear regression analysis. Similar equations can be established for the conversion coefficients A21–A34 (conversion coefficients for the G and B signals), and all the conversion coefficients A11–A34 can be evaluated by solving all the equations.

Expression 2

$$\begin{cases} \sum_i (Cyi^2)*A11 + \sum_i (Cyi*Yei)*A12 + \\ \sum_i (Cyi*Mgi)*A13 + \sum_i (Cyi*Gri)*A14 = \sum_i (Cyi*Ri) \\ \sum_i (Yei*Cyi)*A11 + \sum_i (Yei^2)*A12 + \\ \sum_i (Yei*Mgi)*A13 + \sum_i (Yei*Gri)*A14 = \sum_i (Yei*Ri) \\ \sum_i (Mgi*Cyi)*A11 + \sum_i (Mgi*Yei)*A12 + \sum_i (Mgi^2)*A13 + \\ \sum_i (Mgi*Gri)*A14 + \sum_i (Mgi*Ri) \\ \sum_i (Gri*Cyi)*A11 + \sum_i (Gri*Yei)*A12 + \\ \sum_i (Gri*Mgi)*A13 + \sum_i (Gri^2)*A14 = \sum_i (Gri*Ri) \end{cases} \quad (2)$$

However, the conversion coefficients A11–A34 calculated in this way are ones in the case where noise and the change of the illuminating light source are not considered at all.

Accordingly, when the output CYMG signals are converted in accordance with a conversion matrix (hereinbelow, termed "noiseless-signal conversion matrix") whose elements are the conversion coefficients A11–A34 evaluated here, RGB signals which are favorable (close to the prescribed RGB signals) are obtained in the absence of the noise etc., but the influences of the noise etc. appear intensely in RGB signals in the presence of the noise ascribable to the CCD, etc.

In the present invention, therefore, in order to calculate a conversion matrix for obtaining RGB signals appropriate as the prescribed RGB signals even in the presence of the noise and the change of the illuminating light source, output CYMG signals in which errors ascribable to the noise or the change of the illuminating light source are involved are supposed, and the conversion coefficients A11–A34 which minimize the errors between the above theoretical values and RGB signals obtained by converting the predicted output CYMG signals in accordance with Expression (1) are further calculated.

The case of considering the noise will be explained as an example. Particularly, signals with predetermined noise ±N added to the output CYMG signals are converted as the CYMG signals of Expression (1). On this occasion, noise does not develop uniformly in all of the C, Y, M and G signals. Accordingly, there are predicted a pattern in which noise develops in one of the C, Y, M and G signals, a pattern in which noise develops in two of them, a pattern in which noise develops in three of them, a pattern in which noise develops in all the four signals, and a pattern in which noise does not develop. The conversion matrix is calculated on the basis of Expression (2) by employing some or all combinations in the respective patterns.

Besides, the conversion matrix is calculated assuming a case where the noise develops in the predetermined quantity ±N which is equal for the respective signals C, Y, M and G in each of the patterns. Subsequently, when the conversion matrix (hereinbelow, termed "noisy-signal conversion matrix") is calculated, the noisy-signal conversion matrix and the noiseless-signal conversion matrix are associated through weighting, thereby to obtain a conversion matrix desired.

The conversion matrix (hereinbelow, termed "target conversion matrix") obtained here becomes less susceptible to the noise even in the situation where the noise has developed in the output CYMG signals.

FIG. 1 is a diagram showing the errors of RGB signals relative to the theoretical values, the RGB signals being calculated in the case of not considering the noise (the noiseless-signal conversion matrix) and in the case of considering the noise (the target conversion matrix), in the situation where the noise does not develop in the output CYMG signals, while FIG. 2 is a diagram showing the errors of RGB signals relative to the theoretical values, the RGB signals being calculated in the case of not considering the noise and in the case of considering the noise, in the situation where the noise develops in the output CYMG signals. By the way, in FIGS. 1 and 2, the errors are indicated in terms of Euclidean distances in a Lab space. Herein, in general, errors of at most 6 can be said to produce favorable results in case of supposing the uses of ordinary users, and errors of at least 12 are evidently recognized.

Referring to FIG. 1, the RGB signals calculated by the noiseless-signal conversion matrix and the target conversion matrix exhibit nearly equal values as to average errors and maximum errors, respectively. Besides, the errors of both the RGB signals are less than 6, and they can be said to be values which are favorable for use as the prescribed RGB signals.

On the other hand, referring to FIG. 2, the RGB signals calculated by the noiseless-signal conversion matrix exhibit an impracticable value (79.65) in the maximum error, and they approach a value greater than 6 as cannot be said to be favorable, in the average error. In contrast, the RGB signals calculated by the target conversion matrix exhibit the maximum error which is not evidently recognized as the error, though this maximum error has a value (9.95) which cannot be said to be favorable.

Besides, these RGB signals keep a favorable value (3.20) in the average error. It can therefore be said that a reliability against the noise is higher in the case where the output CYMG signals are converted into the RGB signals in accordance with the target conversion matrix.

Incidentally, the target conversion matrix which produces better results can be calculated depending upon how the value ±N to be added as the noise to the output CYMG signals is set.

Further, elements based on the change of the illuminating light source are added to the output CYMG signals, and calculation is performed in the same way as in the above technique, whereby a conversion matrix which has a higher reliability against the change of the illuminating light source can be calculated.

Here, in calculating conversion matrix for various illuminating light sources, it is necessary to consider chromatic adaptation being a human visual property, and the "White Balance" function of the digital camera or the like.

The "chromatic adaptation" is a function in which the human eye holds a color to-be-recognized somewhat steadily in adaptation to an environment. In a case where the illuminating light source has changed, the color which the human eye recognizes changes slightly on account of the chromatic adaptation. On the other hand, the chromatic adaptation does not proceed in an apparatus such as the digital camera. Therefore, when the illuminating light source changes, output signals also change correspondingly (signals are outputted as different colors). In this regard, the apparatus such as digital camera has the function of making corrections of the RGB signals so that a subject predicted to be white may be outputted as being white. This is the white balance function.

In calculating the conversion matrix in the case of the change of the illuminating light source, accordingly, it is necessary to find the conversion matrix which minimizes errors relative to theoretical values with the effect of the chromatic adaptation taken into consideration, in the RGB signals subjected to white balance processing. The theoretical values with the effect of the chromatic adaptation considered can be calculated in accordance with, for example, the Bradford conversion formula. The signals R, G and B after the white balance processing can be respectively obtained by multiplying the output signals by white balance coefficients. Indicated below by way of example is an expression for converting the output R signal into the R signal after the white balance processing by the multiplication by the white balance coefficient E.

Expression 3

$$Ri = E^*(Cyi^*A11 + Yei^*A12 + Mgi^*A13 + Gri^*A14) \quad (3)$$

As in the case where the noise is involved in the output signals, the conversion coefficients A11–A34 which minimize squared errors from the theoretical values are calculated on the basis of Expression (2) by taking into consideration the RGB signals after the white balance processing thus obtained and the respective illuminating light sources including the effect of the chromatic adaptation. Incidentally, the multiple linear regression analysis may well be made after the respective illuminating light sources are weighted in accordance with the properties thereof.

The conversion matrix obtained here is capable of color conversion into RGB signals appropriate as the prescribed RGB signals, even in the situation where the illuminating light source has changed.

As described above, according to the color conversion method to which the present invention is applied, in the case where the color signals outputted by the sensor such as a CCD are to be converted into the signals expressive of the predetermined colors prescribed in the predetermined color space, the output signals of the CCD or the like are converted using the conversion matrix which is obtained in such a way that the various conversion matrices are calculated in consideration of the elements which are based on the noise developed by the CCD or the like or on the change of the illuminating light source, and that these conversion matrices are subjected to the multiple linear regression analysis.

Accordingly, even in the situation where the various elements ascribable to the noise or the change of the illuminating light source are contained in the output signals of the CCD or the like, the conversion matrix for use in the color conversion can convert the output signals into the signals which are substantially suited to the prescribed color signals, and the color conversion in the apparatus such as digital camera can be made less susceptible to the noise or the illuminating light source.

By the way, in the case of applying the present invention to the apparatus such as a digital camera, the conversion matrix calculated by the above method is stored in a predetermined storage unit, and the color signals outputted from the sensor such as the CCD are multiplied by the conversion matrix, whereby the signals expressive of the predetermined colors prescribed in the predetermined color space can be obtained. FIG. 3 is a diagram showing the functional construction of the digital camera 1 to which the present invention is applied. Referring to FIG. 3, the color signals such as RGB signals are inputted from the CCD to a color conversion unit 10. Besides, the color conversion unit 10 in which the above conversion matrix is stored converts the inputted color signals into the predetermined color signals by this conversion matrix, and it thereafter outputs the resulting signals to individual functional units. Incidentally, only the color conversion unit 10 for the color conversion and parts relevant thereto are illustrated in FIG. 3, and the other functional parts are omitted from illustration.

According to the present invention, in a case where input color signals outputted by a sensor such as a CCD are to be converted into output color signals expressive of predetermined colors prescribed in a predetermined color space, a fundamental conversion matrix and corrective conversion matrix are calculated by a multivariate analysis in consideration of elements based on noise developed by the CCD or the like or on the change of an illuminating light source, and the input color signals are converted using a target conversion matrix which is obtained from these conversion matrices.

Accordingly, even in a situation where the various elements ascribable to the noise or the change of the illuminating light source are contained in the output signals of the CCD or the like, the target conversion matrix for use in the color conversion can convert the output signals into the signals which are substantially suited to the prescribed color signals, and the color conversion in an apparatus such as digital camera can be made less susceptible to the noise or the illuminating light source. That is, the color conversion can be easily effected in accordance with the color conversion matrix which is capable of more appropriate color conversion.

Moreover, color conversion in which the effect of chromatic adaptation and the effect of white balance are taken into consideration can be performed, so that the color conversion can be performed more appropriately and more easily.

The entire disclosure of Japanese Patent Application Nos. 2001-320776 filed Oct. 18, 2001 and 2002-221997 filed Jul. 30, 2002 are incorporated by reference herein.

What is claimed is:

1. A color conversion method wherein an input color signal is converted into an output color signal prescribed in a predetermined color space, the method comprising:
receiving an evaluation input color signal based on a standardized color chart;
calculating by a multivariate analysis a fundamental conversion matrix for converting the evaluation input color signal into an evaluation output color signal, by performing a multiple linear regression analysis to minimize squared errors of the evaluation output color signal relative to a theoretical output color signal, the theoretical output color signal being based on the standardized color chart;
calculating a corrective color signal by modifying the evaluation input color signal with a predetermined corrective element;
calculating by a multivariate analysis a corrective conversion matrix for converting the corrective color signal into a corrective output color signal, by performing a multiple linear regression analysis to minimize squared errors of the corrective output color signal relative to the theoretical output color signal;

calculating a target conversion matrix from the fundamental conversion matrix and the corrective conversion matrix by associating the fundamental conversion matrix and the corrective conversion matrix through weighting; and converting the input color signal into the output color signal in accordance with the target conversion matrix.

2. A color conversion method as defined in claim 1, wherein noise predicted to develop in the input color signal is set as the predetermined corrective element.

3. A color conversion method as defined in claim 1, wherein the predetermined corrective element is based on a difference resulting from using an illuminating light source in generation of the evaluation input color signal.

4. A color conversion method as defined in claim 3, wherein the predetermined corrective element is calculated on the basis of an effect of chromatic adaptation and an effect of white balance as are attributed to the difference of the illuminating light source.

5. A color conversion apparatus wherein an input color signal is converted into an output color signal prescribed in a predetermined color space, the apparatus comprising:

means for receiving an evaluation input color signal based on a standardized color chart;

means for calculating by a multivariate analysis a fundamental conversion matrix for converting the evaluation input color signal into an evaluation output color signal, by performing a multiple linear regression analysis to minimize squared errors of the evaluation output color signal relative to a theoretical output color signal, the theoretical output color signal being based on the standardized color chart;

means for calculating a corrective color signal by modifying the evaluation input color signal with a predetermined corrective element;

means for calculating by a multivariate analysis a corrective conversion matrix for converting the corrective color signal into a corrective output color signal, by performing a multiple linear regression analysis to minimize sugared errors of the corrective output color signal relative to the theoretical output color signal;

means for calculating a target conversion matrix from the fundamental conversion matrix and the corrective conversion matrix by associating the fundamental conversion matrix and the corrective conversion matrix through weighting; and means for converting the input color signal into the output color signal in accordance with the target conversion matrix.

6. A color conversion apparatus as defined in claim 5, wherein noise predicted to develop in the input color signal is set as the predetermined corrective element.

7. A color conversion apparatus as defined in claim 5, wherein the predetermined corrective element is based on a difference resulting from using an illuminating light source in generation of the evaluation input color signal.

8. A color conversion apparatus as defined in claim 7, wherein the predetermined corrective element is calculated on the basis of an effect of chromatic adaptation and an effect of white balance as are attributed to the difference of the illuminating light source.

9. A color conversion matrix generation program embodied in a computer readable medium for performing steps for generating a target color conversion matrix for converting an input color signal into an output color signal prescribed in a predetermined color space, the steps comprising:

receiving an evaluation input color signal based on a standardized color chart;

calculating by a multivariate analysis a fundamental conversion matrix for converting the evaluation input color signal into an evaluation output color signal, by performing a multiple linear regression analysis to minimize squared errors of the evaluation output color signal relative to a theoretical output color signal, the theoretical output color signal being based on the standardized color chart;

calculating a corrective color signal by modifying the evaluation input color signal with a predetermined corrective element;

calculating by a multivariate analysis a corrective conversion matrix for converting the corrective color signal into a corrective output color signal, by performing a multiple linear repression analysis to minimize squared errors of the corrective output color signal relative to the theoretical output color signal; and generating a target color conversion matrix, for converting the input color signal into the output color signal prescribed in the predetermined color space, from the fundamental conversion matrix and the corrective conversion matrix by associating the fundamental conversion matrix and the corrective conversion matrix through weighting, the target conversion matrix being.

10. A color conversion matrix generation program as defined in claim 9, wherein the predetermined corrective element is noise predicted to develop in the input color signal.

11. A color conversion matrix generation program as defined in claim 9, wherein the predetermined corrective element is based on a difference resulting from using an illuminating light source in generation of the evaluation input color signal.

12. A color conversion matrix generation program as defined in claim 11, wherein the predetermined corrective element is calculated on the basis of an effect of chromatic adaptation and an effect of white balance as are attributed to the difference of the illuminating light source.

* * * * *